United States Patent
Wayne

(10) Patent No.: US 6,170,795 B1
(45) Date of Patent: Jan. 9, 2001

(54) APPARATUS AND METHOD FOR PRECISION ADJUSTMENT OF THE ANGULAR POSITION OF AN OPTICAL DEVICE

(75) Inventor: Kenneth J. Wayne, Saratoga, CA (US)

(73) Assignee: Agilent Technologies, Palo Alto, CA (US)

( * ) Notice: Under 35 U.S.C. 154(b), the term of this patent shall be extended for 0 days.

(21) Appl. No.: 09/221,176

(22) Filed: Dec. 23, 1998

(51) Int. Cl.[7] .......................... F16M 1/00; F16M 11/00; F16M 3/00; F16M 5/00; F16M 7/00

(52) U.S. Cl. ............... 248/664; 248/288.31; 248/288.51; 359/223; 359/818

(58) Field of Search .................................. 248/664, 466, 248/481, 288.31, 288.51; 359/871, 872, 875, 876, 226, 664, 818

(56) References Cited

U.S. PATENT DOCUMENTS

| | | | |
|---|---|---|---|
| 4,043,686 | * | 8/1977 | Hackett .................................. 403/90 |
| 4,639,081 | * | 1/1987 | O'Brien ................................ 359/478 |
| 5,502,598 | * | 3/1996 | Kimura et al. ........................ 359/814 |
| 5,591,907 | * | 1/1997 | Stein et al. .......................... 73/170.16 |
| 5,946,127 | * | 8/1999 | Nagata ................................. 359/280 |

* cited by examiner

Primary Examiner—Ramon O. Ramirez
Assistant Examiner—A. Joseph Wujciak

(57) ABSTRACT

An optical device mounting apparatus and method for altering and fixing the angular position of an optical device without substantial linear displacement. The apparatus comprises a kinematic mount which permits precision adjustment and clamping. The apparatus includes a sphere, which either contains an optical device mounted therein or is, at least partially, an optical device itself. A support is placed in physical contact with the outer surface of the sphere such that angular displacement of the sphere is possible with substantially no linear displacement thereof. A clamp in physical contact with the outer surface of the sphere provides force through the sphere to the support with substantially no transmitted torque. In this manner, precise positioning of the optical device is possible, for example, with an external and removable tool. In various alternative embodiments, a central axis of the optical device may be positioned along a central axis of the sphere and/or all clamping forces may be directed through the center of rotation of the sphere.

36 Claims, 7 Drawing Sheets

APPARATUS AND METHOD FOR PRECISION ADJUSTMENT OF THE ANGULAR POSITION OF AN OPTICAL DEVICE

BACKGROUND OF THE INVENTION

1. Field of the Invention

The present invention relates to an optical device mounting apparatus and method for adjusting the angular position of the optical device without substantial linear displacement thereof and, more specifically, to an apparatus and method for enabling precise adjustment of the direction of a laser beam and/or precise translation without angular deviation.

2. Description of the Related Art

In various optical systems, manufacturers or operators must align and position multiple optical components with great accuracy and repeatability. Also, because lasers are often used as light sources in modern optical systems, it is often desirable to manipulate the direction of a laser beam (i.e., angular adjustment) without changing its linear position (i.e., without translation). Accordingly, it is often desirable to isolate angular adjustments of the optical system's components in each plane. Further, it is often desirable that angular adjustment of the components be independent from translational adjustments. All the final adjustments must then be ruggedly clamped to survive shipping, installation, and/or use of the product in the operator's environment. With conventional adjustable mounts, however, the act of clamping often disturbs the adjustment of the optical device, and poor clampability can result in angular displacement of the optical device during shipping and/or installation.

One such optical system that requires precision optical positioning of its components is a laser interferometer system. Laser interferometer positioning systems are key components in integrated circuit (IC) fabrication equipment, such as photolithography steppers, X-ray steppers, and E-beam machines. With the accuracy and repeatability available from laser interferometers, multiple layers on ICs can be precisely aligned, resulting in higher circuit densities and greater yields. IC inspection and repair systems also benefit from the precision of laser interferometer systems. A laser interferometer's measurement repeatability is crucial for manufacturing high storage capacity disk drives in the computer industry. Laser interferometer positioning is also used in the manufacture of other measurement devices, such as holographic, glass, and metal scales, and for calibration of the same. The high resolution and precision motion control capability of laser interferometers enable precision cutting machines (milling, turning, and grinding machines) to produce more accurate parts with smoother surface finishes. Laser interferometer positioning systems are also generally used in a wide range of other applications, including advanced metrology, coordinate measuring machines, mechanical vibration analysis, PC board manufacturing, and the like. Laser interferometer systems are especially useful in making linear distance, diagonal, and angular measurements, as well as for measuring flatness, way straightness, linear parallelism, and the like.

Laser interferometer systems are based on techniques pioneered by A. A. Michelson in the late 1890's to measure distances by counting wavelengths of the carrier signal. Michelson used a half-silvered mirror to split the beam from a light source into two beams, which were reflected from remote mirrors and again recombined at the half-silvered mirror. With the mirrors exactly aligned and motionless, the observer sees a constant intensity of light; but, if one of the mirrors is moved very slowly, the observer will see the beam repeatedly increasing and then decreasing in intensity as the light from the two paths adds and cancels. Each half-wavelength of mirror travel results in a total optical path change of one wavelength and one complete cycle of intensity change. If the wavelength of the light is known, then the travel of the mirror can be accurately determined.

To convert Michelson's apparatus into a crude electronic measuring instrument required only a photocell to convert beam intensity into a varying electrical signal, and an electronic counter to total the cycles of beam intensity. To make such a device practical, however, several other improvements were necessary. First, modern interferometers use lasers as light sources for two reasons: if the interferometer is to be used over any significant distance, the light must be pure (i.e., single wavelength). If the interferometer is to be accurate, then the wavelength must be exactly known. A second improvement included direction sensing electronics. A single photocell could not adequately sense the direction of movement of the target reflector. The method used by most conventional interferometers to sense direction includes splitting one of the optical beams into two portions, delaying one portion in phase by 90°, and then, after recombination, detecting each portion of the beam using a separate photocell. This technique produces two signals, which vary sinusoidally in intensity as the reflectors move, and the signals differ in phase brightness by 90°. After DC amplification, these two signals can be used to drive a reversible counter, and the phase separation is sufficient to inform the counter of the direction of the motion. The third improvement, which has only partially been addressed, is precision positioning of the optical components (i.e., the mirrors).

Modern laser interferometer systems are commonly used by OEMS as the scale in precision motion control systems. Typically, these systems utilize several axes of linear and angular motion. Since one laser can supply light to six or more interferometer axes, there is a need for multiple beam splitters and beam bender mirrors to divide beams and deliver them to each interferometer. Also, since the output beam from an interferometer should be precisely parallel to the direction of axis motion, individual input beam legs must be angularly steered and translated in order to align to each interferometer.

The desire to adjust and fix the angular direction and position of laser beams with great accuracy and precision has increased in recent years. In various applications, such as medical, research, IC manufacturing, fiber optics and metrology, a long felt, yet unsolved, need exists to precisely adjust a laser beam's angular direction without affecting the beam's linear direction (i.e., without translating the beam). Also, the ability to precisely translate a laser beam without angular deviation has eluded artisans in the optics industry for years. These adjustments most often must be independent from one another and ruggedly clampable (as discussed above) without disturbing the initial alignment setting.

Conventional adjustable mounts are generally large, fragile, subject to vibration and thermal expansion errors, and are difficult to clamp. Furthermore, the act of clamping often disturbs the initial adjustment setting. Specifically, conventional kinematic mounts, such as the Newport™ Model 600A adjustable mount, typically offer good resolution but, in addition to the above, translate a laser beam while steering its angle. Therefore, these parameters (i.e., translation and angular position) cannot be independently adjusted. Gimballed mounts, such as the Newport™ SL and SK series adjustable mounts, typically avoid the beam translation problem by mounting the mirror to the base along a central axis of the mirror. However, these gimballed mounts exhibit poor resolution, environmental sensitivity, and clampability, along with fragility and large size. Semi-kinematic mounts, such as the Zygo™ Models 7010 and 7011 and the HP® Models 10710 and 10711 adjustable mounts, typically have almost unusable resolution and clampability for ultra-sensitive applications.

As the demand for more precise optical systems continues to grow, new and improved devices and methods for adjusting and fixing the angular position of an optical device and/or a laser beam are needed. To date, there is no efficacious and economically acceptable apparatus or method for performing this task.

SUMMARY OF THE INVENTION

Accordingly, the present invention is directed to an optical device mounting apparatus and method for adjusting the angular position of an optical device and/or a laser beam without substantial linear displacement thereof. The unique configuration of the present invention allows the optical device to be fixed in an adjusted position without substantial movement in any direction.

The apparatus includes a sphere, which either contains an optical device mounted therein or at least a portion of which is an optical device itself. A support is placed in physical contact with the outer surface of the sphere such that angular displacement of the sphere is possible with substantially no linear displacement thereof. A clamp in physical contact with the outer surface of the sphere is capable of providing force against the support through the sphere while transmitting substantially no torque to the sphere. In this manner, precise positioning of the optical device is possible.

In various alternative embodiments, it is contemplated that a central axis of the optical device may be positioned along a central axis of the sphere and/or all clamping forces may be directed through the center of rotation of the sphere. If desired, the sphere may be adapted to receive a removable adjustment tool, thereby reducing the mass of the apparatus that would otherwise be attributable to conventional permanent adjustment tools. If substantially pure kinematic operation is desired, the support may include a plurality of substantially rigid balls positioned to provide point contact along the outer surface of the sphere. The support may also include a bearing raceway adapted to receive the balls and to allow individual rotational motion of the balls therein responsive to movement of the sphere. In an alternative embodiment, the balls may be substantially permanently disposed in the support. If semi-kinematic operation is sufficient for a given application, the support can include a bore adapted to receive the sphere and provide line contact about the outer surface thereof.

The clamp of the present invention may include a structural member having an orifice formed therein. A plunger may be slidably disposed within the orifice, with the first end of the plunger being adapted to contact the outer surface of the sphere. A substantially rigid ball may be disposed within the orifice proximate the second end of the plunger. At least one adjustable fastener or a fixed spring fastener may be positioned on the structural member to provide compressive force through the ball. A pre-tension spring may be disposed within the orifice such that the spring supports the ball above the second end of the plunger when compressive force from the adjustable fastener(s) is not sufficient to overcome the opposing compressive force of the pretension spring. In an alternative embodiment, a single adjustable fastener in contact with the substantially rigid ball provides the clamping force.

In another alternative embodiment, the apparatus includes a sphere which either contains an optical device mounted therein or at least a portion of which is an optical device itself, a support and a clamp. A support and a clamp having at least two possible positions are placed in contact with the outer surface of the sphere. When the clamp is in a first position, the sphere may rotate in any direction about its center point without substantial linear displacement of the center point. When the clamp is in the second position, the sphere is prevented from rotating.

The present invention is also directed to a method for precision adjustment of the angular position of an optical device without substantial linear displacement. The method includes the steps of providing a sphere, which either contains an optical device therein or is an optical device itself, and supporting the sphere such that angular displacement of the sphere is possible without substantial linear displacement. The angular position of the sphere is then altered, and the sphere is fixed in the altered position without substantial displacement in any direction.

In various alternative embodiments the method may include the step of positioning a central axis of the optical device along a central axis of the sphere before altering the angular position of the sphere and/or directing a clamping force through the center of rotation of the sphere. If desired, a removable adjustment tool may be used to alter the angular position of the sphere. Various applications may require that support for the sphere be provided by a plurality of substantially rigid balls (e.g., a three-ball nest), by a chamfered bore, by protrusions positioned about the circumference of a bore in a trihedral pattern, or the like. If balls are used to support the sphere, a bearing raceway may be provided to receive the balls and to allow the balls to rotate in response to movement of the sphere. The sphere may be fixed in the altered position by a clamp having a structural member, a plunger, at least one adjustable fastener, a ball, and at least one spring in communication with each other as described above.

BRIEF DESCRIPTION OF THE DRAWINGS

Other objects and features of the present invention will become apparent from the detailed description when read in light of the attached drawings. It is to be understood that these drawings are for illustration purposes only and are not intended to define the limits of the present invention, wherein.

DETAILED DESCRIPTION

Figure 1:
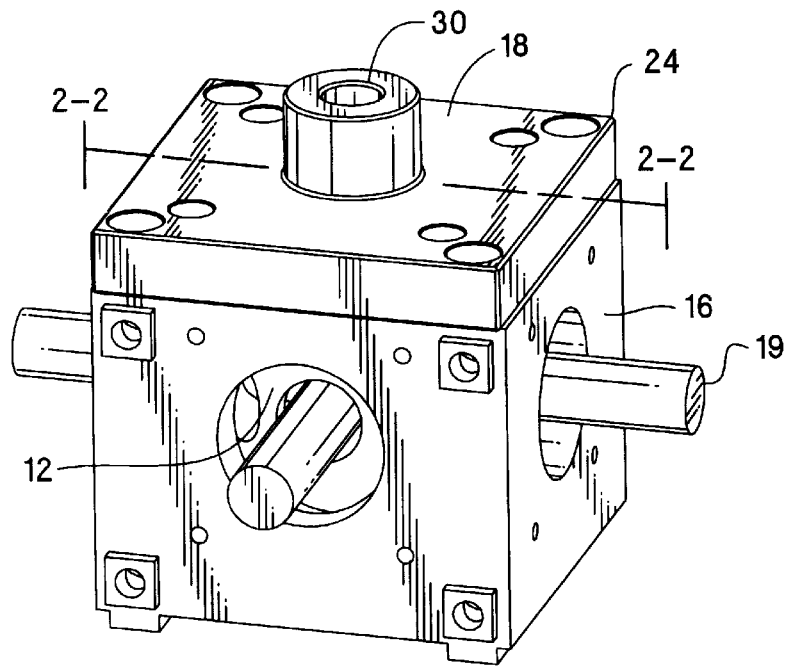
FIG. 1 is an elevated perspective view of an optical device mounting apparatus according to an embodiment of the present invention.
Figure 2:
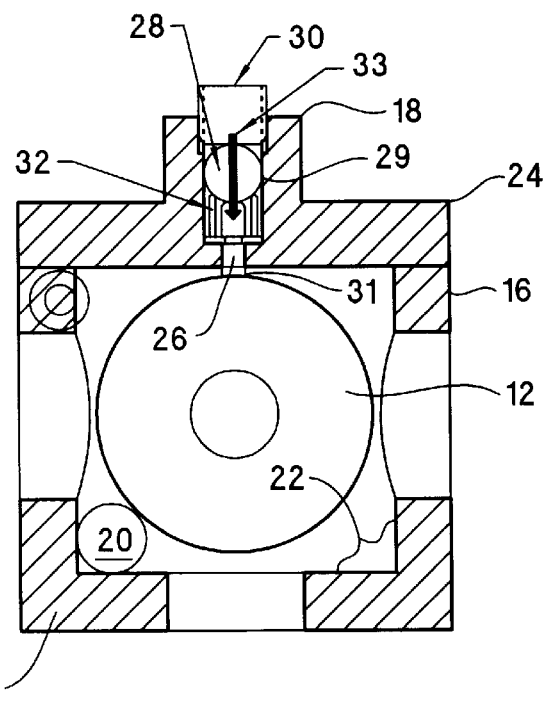
FIG. 2 is a cross-sectional view along line 2—2 of FIG. 1.
Figure 3:
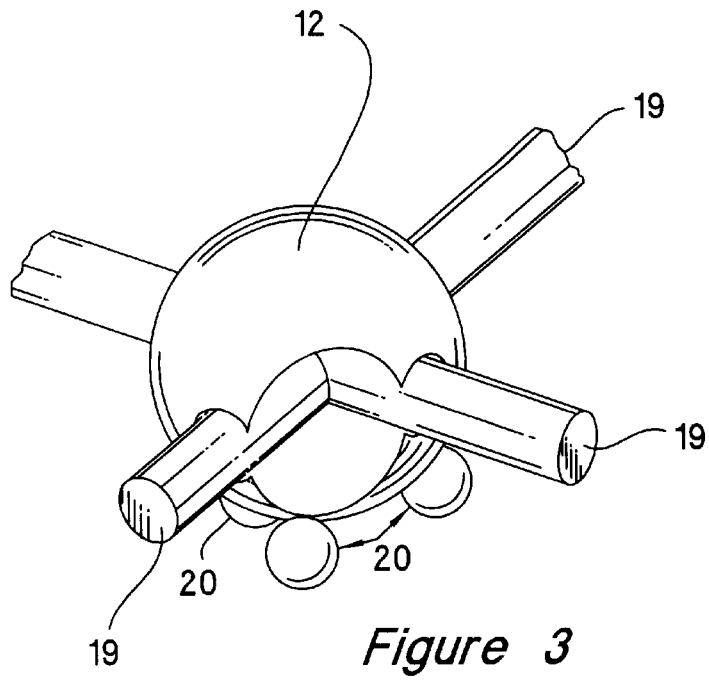
FIG. 3 is a cut-away, perspective view of an aspect of an optical device mounting apparatus according to an embodiment of the present invention.

The present invention is directed to an optical device mounting apparatus and method for adjusting the angular position of an optical device without substantial linear displacement thereof. With reference to FIGS. 1–3 and 6, one embodiment of the present invention includes a sphere 12 and a support 14 in physical contact with the outer surface of sphere 12. Sphere 12 includes an optical device, which in the context of the present invention, indicates that sphere 12 can be machined or otherwise adapted to receive an optical device (not shown) therein, or that at least a portion of sphere 12 can be an optical device itself (e.g., a glass sphere, a spherical mirror, or the like). As discussed in detail below, the configuration of support 14 allows for angular displacement of sphere 12 with substantially no linear displacement thereof. As used herein, the term "angular displacement" refers to rotational motion of sphere 12 about its center of rotation in at least one of a plurality of planes without translation (i.e., "linear displacement") of the center of rotation. As used herein, the term "linear displacement" refers to linear motion of the mechanical center of the sphere.

The apparatus may further include a housing 16 (FIGS. 1, 2, 4–6, and 9–11) capable of receiving sphere 12 and support 14 therein. A clamp 18 (FIGS. 1, 2, and 6–10) is positioned in physical contact with the outer surface of sphere 12 to provide force through sphere 12 and, therefore, to support 14 with substantially no transmitted torque. Accordingly, clamp 18 is capable of providing substantially unidirectional force against the surface of sphere 12 without imparting substantial rotational force (i.e., transmitted torque) thereto. With this configuration, the angular position of sphere 12 and, therefore, the optical device can be precisely adjusted and subsequently maintained by clamp 18.

The term "optical device," as used herein, includes any device that may require adjustment of its physical orientation in more than one plane to control an aspect of electromagnetic radiation. Examples of optical devices include mirrors, beam splitters, beam benders, lenses, translation plates, waveplates, polarizers, fiber optics, lasers, and the like. If the optical device is mounted in sphere 12, it may be necessary to provide holes in sphere 12 so that light 19 can communicate with the optical device therein.

Figure 6:
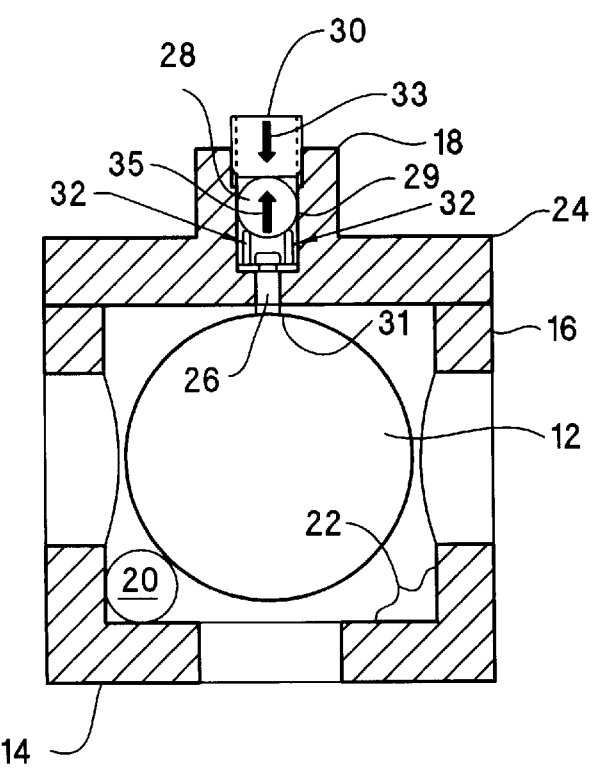
FIG. 6 is a cross-sectional view along line 2—2 of FIG. 1.
Figure 7:
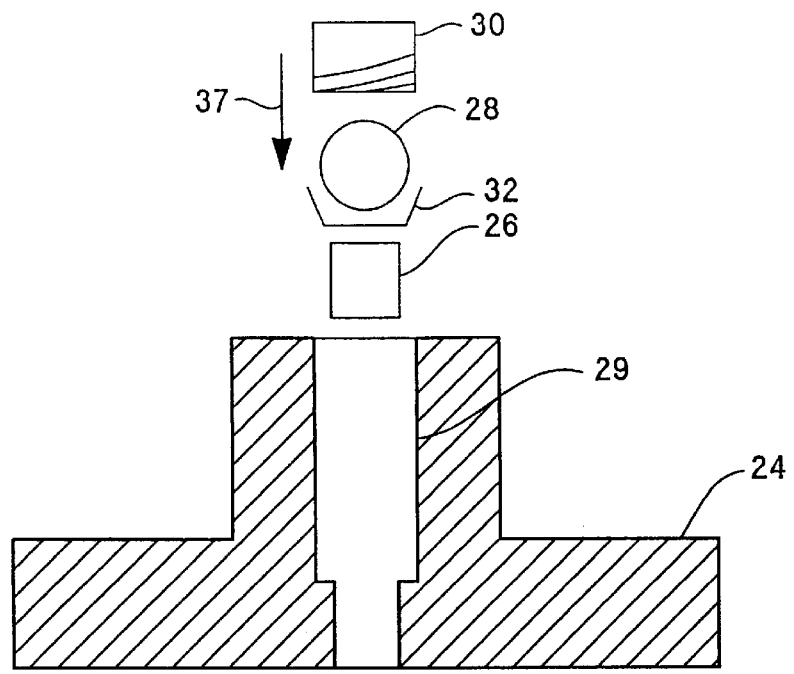
FIG. 7 is a cross-sectional, expanded view of a clamp according to an embodiment of the present invention.
Figure 8:
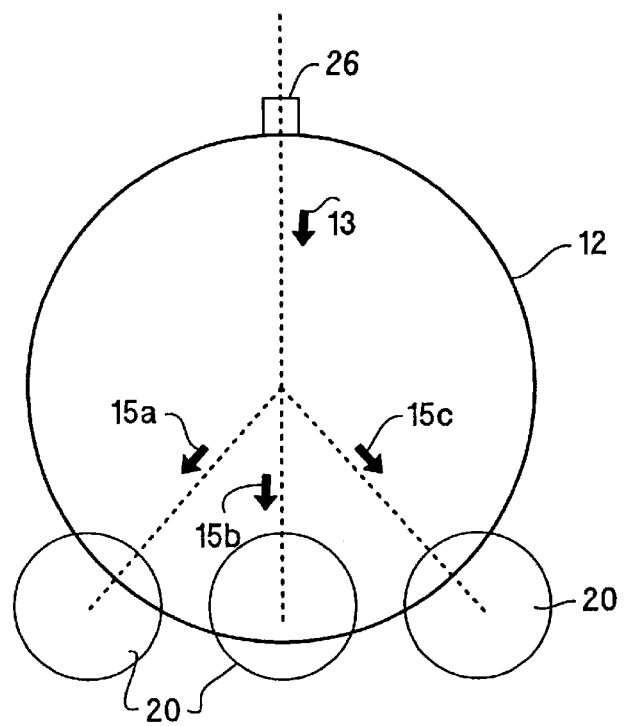
FIG. 8 is a cut-away, perspective view of an aspect of an optical device mounting apparatus according to an embodiment of the present invention.

In the embodiment shown in FIGS. 2, 3, 6, 8, and 11 (note: only one of three support balls is shown in FIG. 6), support 14 comprises a three-ball nest 20, which, along with clamp 18, constrain sphere 12 with only four contact points (i.e., where the sphere contacts each of the three balls and where the sphere contacts the clamp). Therefore, motion can be simultaneous in multiple planes or independent in one plane at a time. As shown in FIG. 8, all constraining forces 13, 15a, 15b, and 15c in this embodiment emanate from point contact and are directed through the center of sphere 12. Clamping force 13, in particular, is resolved into three component forces 15a, 15b, and 15c directed at the centers of the balls of three-ball nest 20, and three-ball nest 20 is constrained by a bearing raceway 22 (FIGS. 2 and 6) in housing 16 either kinematically, for example, by a spring ball retainer 44 (FIG. 11) or by allowing the balls to rotate; or semi-kinematically, by rigidly fixing the balls to housing 16. If the balls are allowed to rotate, raceway 22 may be coated with a lubricant to decrease its coefficient of friction. If the balls are fixed, they may be secured in raceway 22 by glueing (e.g., using epoxy resin), welding, press fitting, or the like, or the balls may be kinematically constrained with spring ball retainer 44. In an alternative embodiment, discrete, recessed bores (not shown) may be formed in the bottom of housing 16 and sized to receive a single ball in each bore. Optionally, the balls may be fixed in their respective bores. If the balls are fixed, they may be provided with a lubricant to decrease their coefficient of friction. An appropriate lubricant can be readily selected by a skilled practitioner based on discrete circumstances in a given application.

Figure 11:
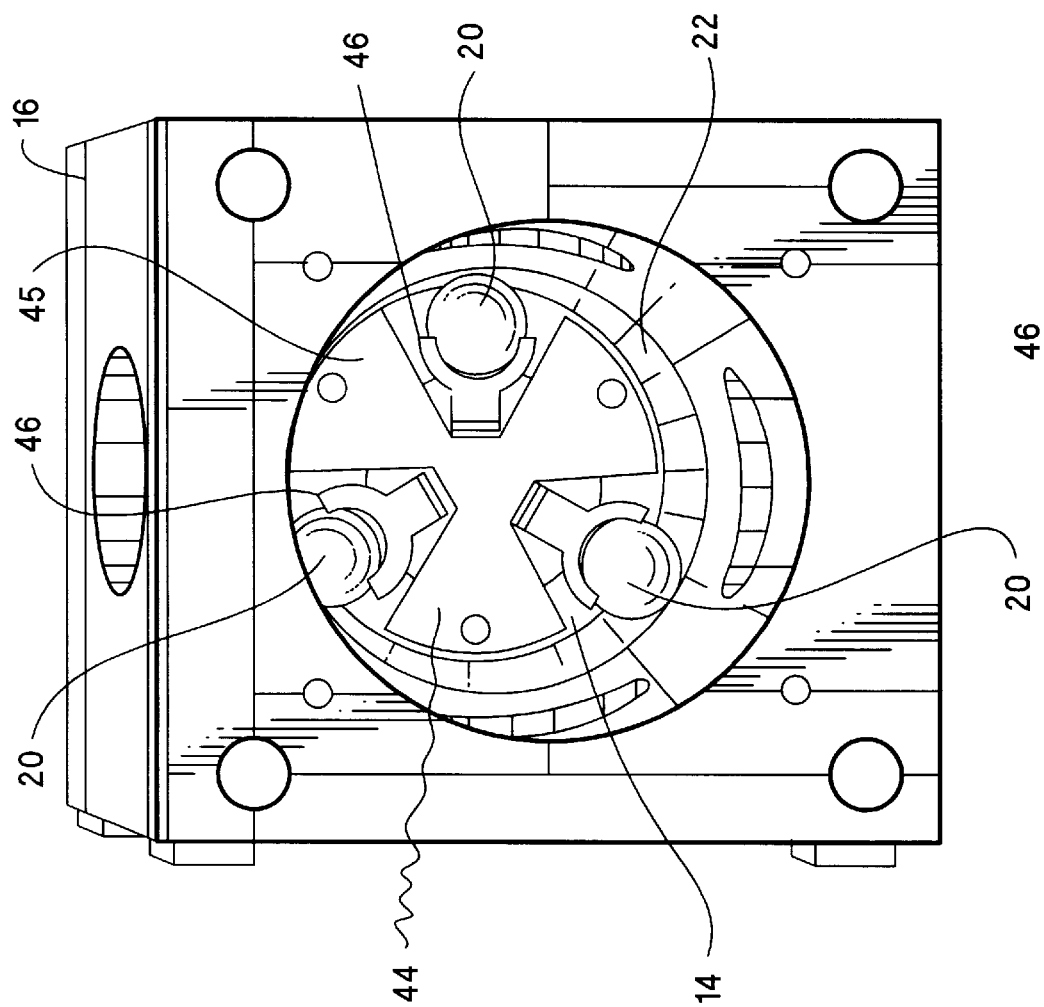
FIG. 11 is an elevational view of an aspect of an optical device mounting apparatus according to an embodiment of the present invention.

If furnished, spring ball retainer 44 preferably provides sufficient force to securely and kinematically locate balls 20 in bearing raceway 22. With reference to FIG. 11, spring ball retainer 44 may include a base portion 45 with one or more retaining members 46 secured thereto. Retaining members 46 and/or base portion 45 may be formed of a reflexive/resilient material that is capable of retaining or recovering its original shape after being compressed or bent. As shown, retaining members 46 can be in the form of a two-pronged fork which, in combination with raceway 22, provides a kinematic mount for balls 20.

In operation, the embodiments shown in FIGS. 2, 3, 6, 8 and 11 rely, at least in part, on principles of kinematic design and elastic averaging. Generally, with any positioning system there will be a degree of error involved in positioning each of its components. The aggregation of these component errors is the "total error" of the system. In this regard, the more predictable the total error, the easier it is to model and compensate for the error. With a pure kinematic mounting, there is no forced geometric congruence (i.e., forced agreement among the parts), and the total error involved in positioning the components of a structure is more predictable. Conversely, elastic averaging mounting generally forces geometric congruence (over constraint), thereby making error evaluation more difficult. A geometric error affected by these two principles results from an indexing motion caused by breaking mechanical contact, repositioning, and then reestablishing mechanical contact. Kinematic principles dictate that an object should be constrained with the minimum number of contact points necessary to adequately support the object, while elastic averaging presupposes that a supported object will require a force opposing the support before the object will be adequately supported without movement. Therefore, the principle of kinematic design is a deterministic approach (for example, a three-legged stool), while the principle of elastic averaging is a probabilistic approach (for example, a five-legged chair with a flexible frame).

Generally, the principle of kinematic design suggests that point contact should be established at the minimum number of points required to constrain a body in a desired position and orientation. Consequently, kinematic designs can be subject to high contact stresses. Therefore, friction and micro-indentation may limit the accuracy of kinematic models. For example, under a load (p) the real area of contact is proportional to the hardness of the softer of the two materials in contact. With sliding, the frictional drag force (f) required to move one surface over another surface is the force necessary to shear the contacts. In this context, the coefficient of friction $\mu$ is defined as the ratio of the horizontal drag force to the normal load. For many metals, hardness is approximately three times the yield stress (Y), and shear strength is approximately half the yield stress. Accordingly, if the contacts were devoid of contaminants, one might expect the following relationship:

$$\mu = f/p = Y/2 \cdot 1/(3Y) = 1/6$$

The above relationship implies that the coefficient of friction is independent of load and geometry, and largely independent of material, if the material used is a metal. Many factors, however, are ignored in this crude model, such as contaminants, rate-related effects, and thermal, mechanical and chemical properties of surfaces. Notwithstanding its shortcomings, the model is sufficient to indicate that, since friction tends to limit the repeatability of kinematic locations, the use of hard surfaces with low interface shear strength may be ideal.

The balls of three-ball nest 20 may be constructed of a hardened ceramic material, or the like. Material selection for sphere 12 will depend on many variables, such as the number of holes in sphere 12, the identification of the optical device, and the available machining tools. Sphere 12 may be formed of a hard material, including ceramics such as aluminum oxide, silicon carbide, and silicon nitride, which will allow sphere 12 to withstand compressive forces without substantial deformation. Because it is difficult to machine hard materials, sphere 12 may be formed, for example, by injection molding a starting material (e.g., aluminum oxide) as a powder, followed by, for example, compaction of the powder into the desired shape and sintering to produce a hardened product.

Contact between two elastic surfaces is complicated by both surface finish and overall shape of the surfaces. These factors and the effects of plastic distortion tend to adversely affect the positioning repeatability of a pure kinematic design. Therefore, in order to realize the full benefits of a kinematic design, large forces should generally be avoided if possible. Large forces can be locked up in a rigidly clamped structure and increase the magnitude of such undesirable instabilities as creep and the effects of thermal mismatch between different materials. In this regard, the unique configuration of the present invention allows loads to be supported and clamps to be maintained, with minimal unidirectional force and a minimum of undesirable secondary force (e.g., torque).

If provided, housing 16 can define bearing raceway 22, concentric to sphere 12, in which each ball of three-ball nest 20 may be fixed or free to rotate. In addition, housing 16 allows the mounting apparatus to be fixed to a machine bed, metrology frame, reference plane, or the like. Housing 16 can be machined such that light 19 can enter to communicate with the optical device and/or exit. If rolling friction is desired, three-ball nest 20 may be free to rotate in raceway 22. In a preferred embodiment, three-ball nest 20 is minimally constrained by a combination of raceway 22 in housing 16 and spring ball retainer 44 attached thereto, and augmented by reaction forces passing through sphere 12 from clamp 18. The balls of three-ball nest 20 may be positioned (e.g., by spring ball retainer 44) around the circumference of raceway 22 such that the distance between any two balls is the same.

Figure 5:
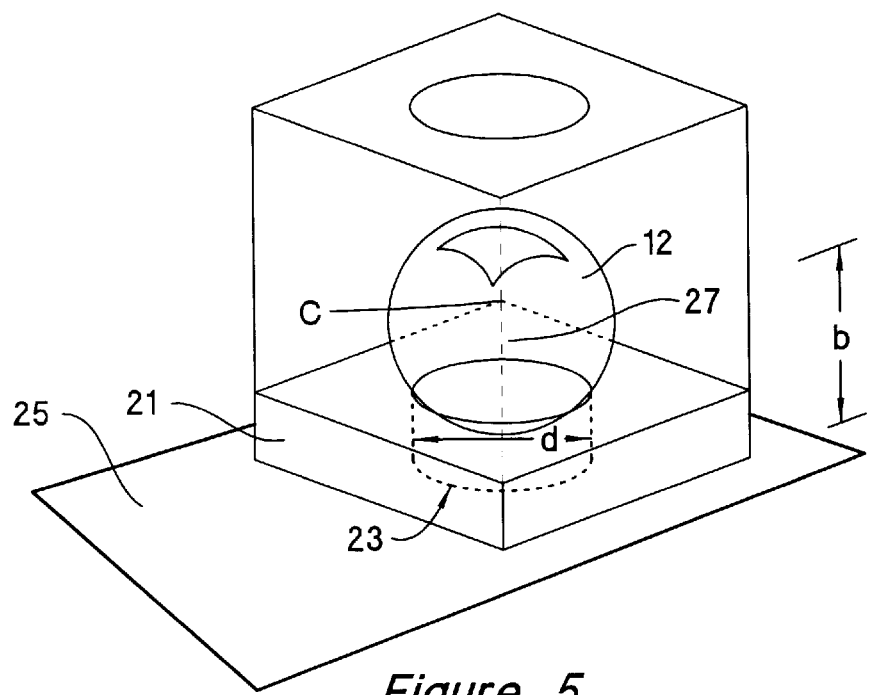
FIG. 5 is a partially cut-away, perspective view of an optical device mounting apparatus according to an embodiment of the present invention.

As shown in FIG. 5, a semi-kinematic embodiment of the present invention includes a support 21 having a hole or bore 23 sized to receive sphere 12 therein. In a preferred embodiment, bore 23 may be chamfered to more easily receive sphere 12 against its circumferential surface. In the embodiment shown, support 21 is disposed on a surface 25, and the distance b between the mechanical center c of sphere 12 and surface 25 is inversely related to the diameter d of bore 23. Therefore, the height of sphere 12 above surface 25 can be controlled by sizing bore 23 accordingly. Although this configuration theoretically provides line contact around a portion of sphere 12, the location of the optical device in this embodiment may only approximate that of the kinematic, three-ball design unless sphere 12 and bore 23 can be produced without finite surface finish errors and errors of form. Because perfectly formed spheres and bores may be difficult to attain, semi-kinematic mounting will typically be accomplished by distortion. Specifically, as sphere 12 is placed in bore 23, it makes a random, first point contact along the imperfect surface of bore 23 and then slides down the chamfered edge of the bore until another, opposing contact provides an equilibrating force. The joint can then support a vertical load, but there is only a two point contact, leaving a linear degree of freedom along a major axis. Sphere 12 is free to rock either way until it makes a third contact. Accordingly, the sphere may be unstable until a sufficient load is applied, such that distortion of the contacts is greater than the imperfections of the two surfaces. In this regard, the clamp of the present invention (not shown in FIG. 5) can provide sufficient load against the contacts. Optionally, bore 23 can include a plurality of protrusions (not shown) along its circumference to form a trihedral hole and to provide point contact and substantially kinematic support to sphere 12.

In certain applications, particular those involving a laser light source, it may be desirable to position a central axis of the optical device (not shown) along a central axis 27 of sphere 12 such that the center of the optical device occupies center point c and, therefore, the center of rotation of sphere 12. If, for example, the optical device is a mirror, this configuration will allow the mirror to be positioned such that its point of incidence is the same as its point of rotation. The identity of incidence and rotation points compels a reflected ray to emerge from the point of incidence notwithstanding variations in the angle of incidence, thereby increasing optical precision, particularly in position measuring optical systems such as laser interferometer systems and the like.

In the embodiments shown in FIGS. 2, 6, 7, and 10 clamp 18 includes a structural member 24 (lid or top plate) having an orifice 29 formed therethrough. A plunger 26, adapted to contact a point 31 along the outer circumferential surface of sphere 12, is slidably disposed within the orifice. A ball 28 is disposed within the orifice proximate plunger 26. Ball 28 may be substantially rigid to resist distortion. An adjustable fastener 30 is placed in contact with ball 28 to impart a compressive force (arrow 33) through ball 28. Although it is contemplated that other adjustable fasteners can be used, a preferred adjustable fastener is a screw. A spring 32 is disposed within the orifice such that spring 32 supports ball 28 above the surface of plunger 26 when compressive force from fastener 30 is not sufficient to overcome an opposing compressive force (arrow 35) of spring 32. Clamp 18 can provide floating, point contact force on sphere 12 during adjustment and a firm, solid clamping force after final positioning is achieved. The combination of simultaneous point contact between ball 28 and fastener 30 and between ball 28 and plunger 26 allows the final clamping force to act unidirectionally through the center of sphere 12. In this manner, substantially no torque or moment is applied to sphere 12, which would disturb its position during clamping. The only motion of kinematically constrained sphere 12 may be slight compressive deflection, which can be minimized by using extremely rigid components.

In operation, fastener 30 bears on ball 28 which, in turn, bears on spring 32 which, in turn, bears on plunger 26 which, in turn, bears on sphere 12 all in a direction denoted by arrow 37. In a first position (shown in FIG. 6) compressive force 33 from fastener 30 is not sufficient to overcome opposing compressive force 35 of spring 32. Therefore, ball 28 is supported above the surface of plunger 26. In this first position, the spring applies light pressure to plunger 26 in order to support ball 28. Therefore, a light spring pressure bears on sphere 12 during adjustment. When adjustment is complete, clamp 18 is placed in a second position (shown in FIG. 2) by tightening fastener 30, which collapses spring 32 and allows ball 28 to bear directly on plunger 26. Although it is contemplated that other fasteners can be used, in the embodiment shown fastener 30 is a set screw which can be rotated to establish the clamping force. Point contact between fastener 30 and ball 28 and between plunger 26 and ball 28 allows for rugged clamping without disturbing the final rotational position of sphere 12. Rather, clamp 18 constrains further rotation by increasing the frictional forces at all points contacting sphere 12. When clamped, the apparatus is in pure compression with all forces directed through the centers of the balls of three-ball nest 20. The combination of housing 16 and three-ball nest 20 directly oppose the force exerted by clamp 18. Therefore, there are substantially no unopposed forces to distort or deform the apparatus with temperature changes. For an even more secure mount, the yield points of the materials can be exceeded, thereby permanently deforming (e.g., indenting) sphere 12 and/or the support balls, which may be acceptable if the apparatus will never be readjusted.

Figure 9:
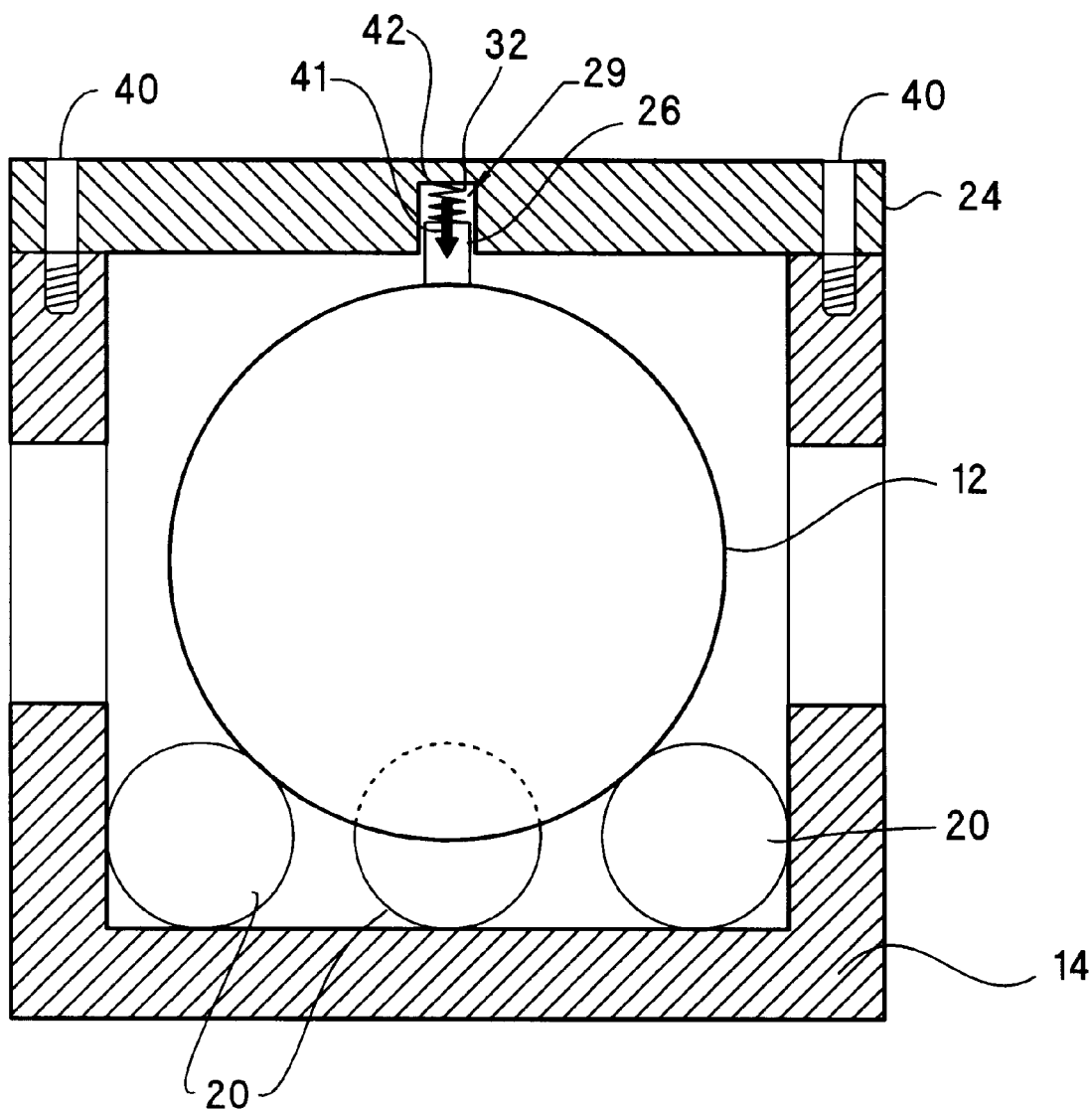
FIG. 9 is a cross-sectional view of another embodiment of the present invention.

As shown in FIG. 9, an alternative embodiment of the clamp of the present invention can include a plurality of adjustable fasteners 40 positioned at various points on structural member 24. In this embodiment, orifice 29 does not pass completely through structural member 24. Plunger 26 is slidably disposed within orifice 29, and spring 32 is disposed within orifice 29 between a recessed surface 42 of structural member 24 and plunger 26. In operation spring 32 provides light pressure (denoted by arrow 41) through plunger 26 against sphere 12 during adjustment (as discussed above). The final clamping force is applied by simultaneously tightening plurality of fasteners 40 such that spring 32 collapses, and recessed surface 42 bears on plunger 26.

The embodiments shown do not permanently incorporate any components to move the position of sphere 12, as this would increase size, mass, and cost. Nevertheless such components could be permanently incorporated in another embodiment. It is noted that in certain applications it may be advantageous to minimize the mass of the apparatus to increase its natural frequency, thereby minimizing unwanted vibrations caused by noise contamination in its operational environment. The addition of permanent adjustment components also increases the manufacturing costs of the apparatus.

Figure 4:
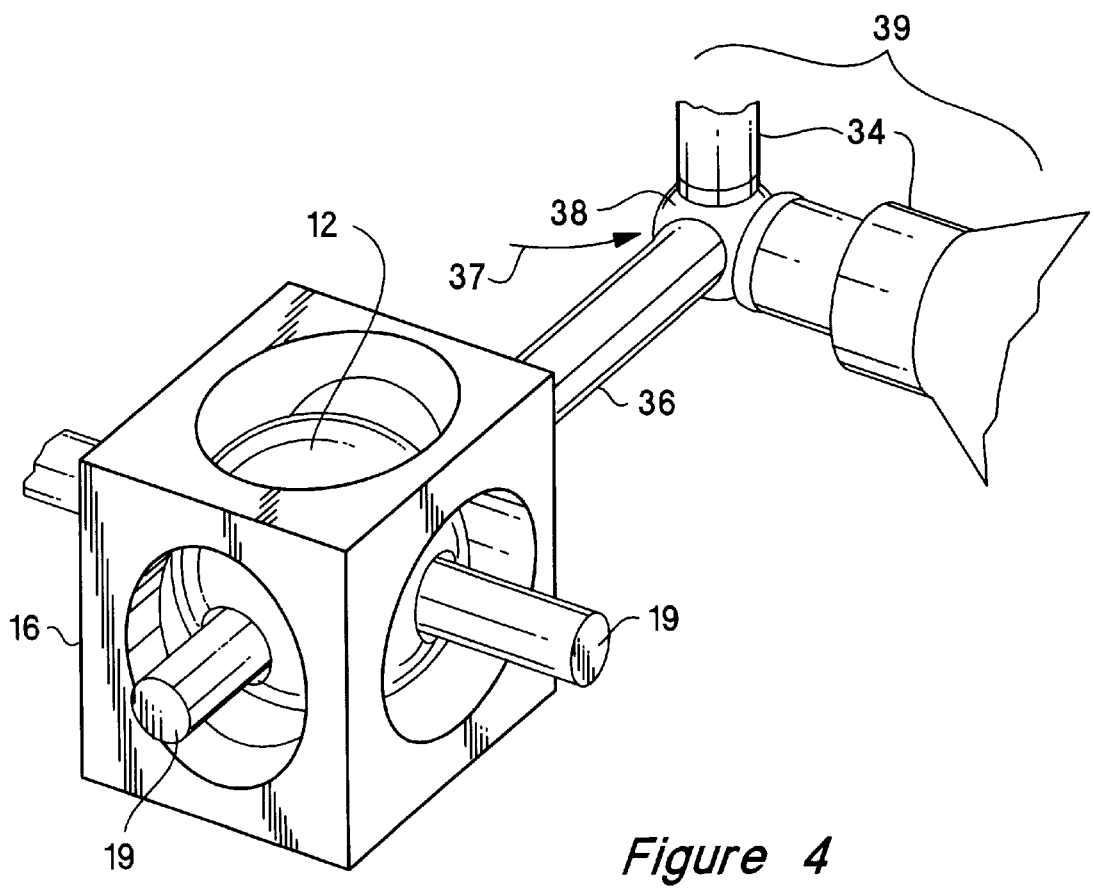
FIG. 4 is a partially cut-away, perspective view of an aspect of an optical device mounting apparatus according to an embodiment of the present invention including a detachable adjustment mechanism.
Figure 10:
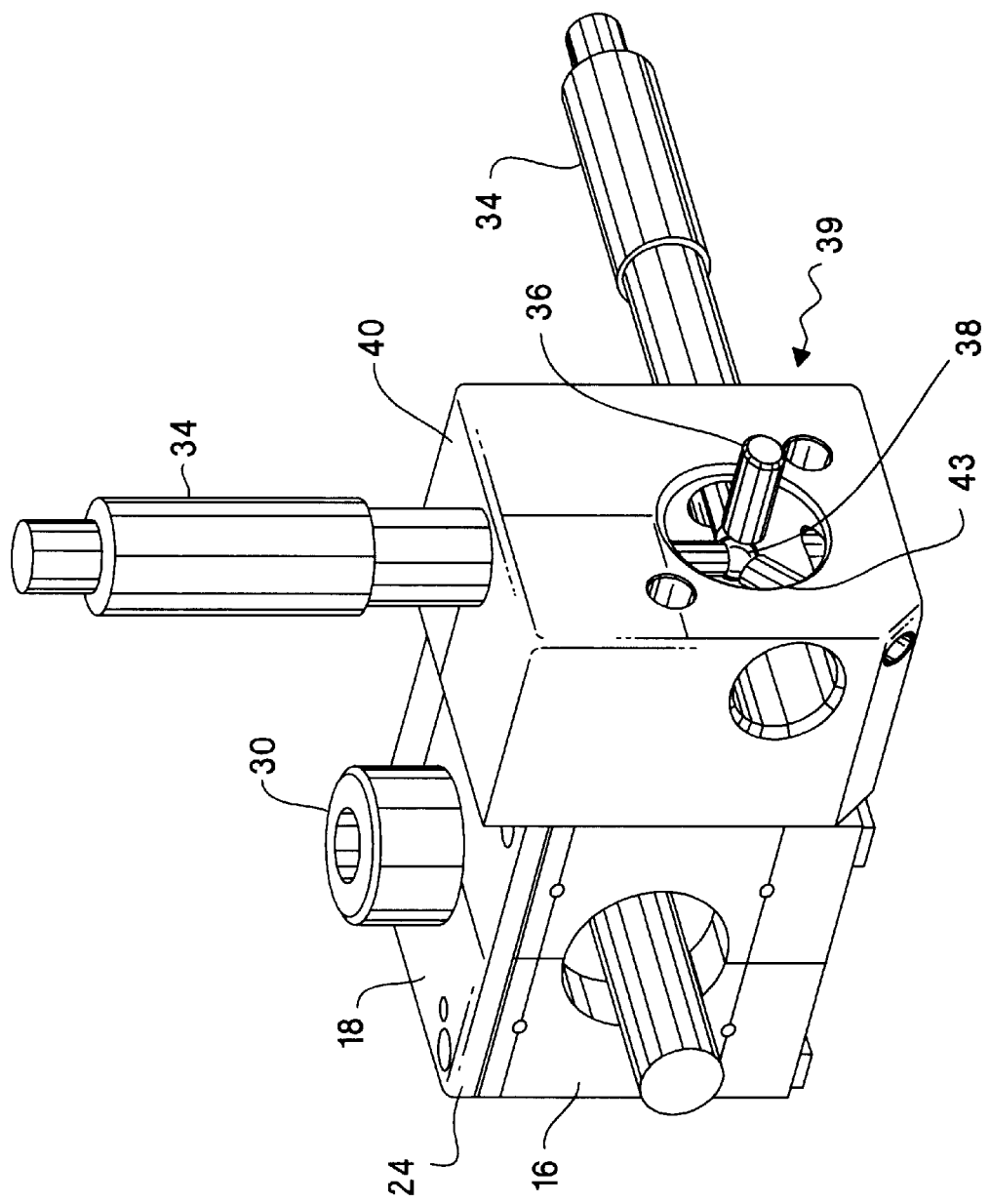
FIG. 10 is a plan view of an aspect of an optical device mounting apparatus according to an embodiment of the present invention including a detachable adjustment mechanism.

As shown in FIG. 4 and FIG. 10, movement of sphere 12 can be effected by an external adjustment tool 39, which is temporarily attached to housing 16 or another reference point. Adjustment tool 39 may include a mounting bracket 40 (FIG. 10) which supports a component 34 capable of fine linear motion in orthogonal axes, such as differential micrometers with spindle ends positioned square to the spindle axes. A lever arm 36 may be temporarily fixed to sphere 12 by an expanding coupling (not shown) or the like for temporarily rigidly fixing arm 36 to sphere 12. A ball 38 may be attached to the opposite end of arm 36 and forced (e.g., by spring force 37) into the corner formed by the flat ends of orthogonally mounted micrometers 34. This arrangement is capable of converting the linear motion of the micrometer screws into rotary motion of sphere 12 in one plane at a time. When adjustment is complete, sphere 12 can be clamped (as discussed above), and adjustment tool 39 can be removed.

Utilizing external adjustment tool 39, linear motion imparted to the end of lever arm 36 in the vertical plane effects pitch rotation of sphere 12. Linear motion imparted to lever arm 36 in the horizontal plane effects yaw rotation of sphere 12. A spring plunger 43 can be provided to bias lever arm 36 against the faces of the micrometer spindles 34 and to provide pitch and yaw constraint when no linear motion is imparted. In the embodiment shown, roll of lever arm 36 about its axis is not constrained, and when the adjustments are at rest, sphere 12 is constrained in five of six possible degrees of freedom.

In some applications, roll rotation of sphere 12 (and its integral optic) will affect beam steering. Thus, it may be desirable to initialize the orientation of sphere 12 in regard to roll prior to adjusting pitch and yaw angles. Before attaching adjustment tool 39 to housing 16, it is contemplated that a setup tool (not shown) can be used to initially orient sphere 12 in roll axis by simultaneously engaging a hole in sphere 12 and one of the ports in housing 16. For example, if a mirror is positioned within sphere 12, the setup tool can preferably orient the sphere such that the plane of incidence of the mirror is horizontal. With the mirror in the correct initial position, the setup tool can be removed and adjustment tool 39 can be attached as discussed above.

It is contemplated that the optical device mounting apparatus of the present invention may find utility in an optical system that would benefit from precise positioning of at least one of its optical components. Examples of such precision optical systems may include laser interferometers, laser transducers, beam splitters, wafer steppers, beam translators, and the like.

A laser interferometer system (not shown) is a set of optical and electronic components that uses the interference of laser light waves to make precise distance measurements. Laser interferometer systems typically include three main sub-systems: the laser head, optics, and electronics. These sub-systems form an advanced Michelson interferometer. The laser head provides the monochromatic light source. The optics direct the beam and generate the interference fringes. The electronics detect the light and dark fringes and process the data to provide distance information in a useful form.

In operation, a laser (typically a low power He/Ne laser) emits a coherent light beam having two optical frequencies, $f_1$ and $f_2$, that are orthogonally polarized. Part of the output beam is split off in the laser head for use in laser tuning and as a reference signal for the electronics, while most of the beam is transmitted to a remote interferometer. The polarization-sensitive interferometer reflects one frequency to a reference point (such as a cube corner or mirror) and transmits the other to a target reflector. The transmitted beam is reflected back to the interferometer where it mixes with the reference beam, before both are transmitted to a receiver. Relative motion between the interferometer and the target reflector causes a Doppler shift in the differential frequency detected by the receiver. When amplified, this Dopplermodulated differential frequency becomes the measurement signal for the electronics. The electronics compares the reference signal from the laser head and the measurement signal from the receiver and processes them to determine positioning with high resolution and useful output.

As discussed above, precision adjustment of optical components (e.g., beam splitters, mirrors, and translation plates) is extremely important in the operation of laser interferometers. Therefore, most conventional interferometers use cube corners, instead of individually adjustable mirrors. However, cube corners cause the interferometer to lose some of the flexibility it would otherwise have with adjustable mirrors. As such, it is contemplated that the optical device mounting apparatus of the present invention may be used to align mirrors with the arc-second sensitivity required for the most sensitive interferometer applications, such as advanced metrology, IC manufacturing and repair, and the like. It is also contemplated that the optical device mounting apparatus may be used to split and direct laser beams to interferometers in multi-axis measurement applications.

The optical device mounting apparatus of the present invention may also be especially useful in a laser beam translator (not shown) to tilt a plane, parallel optical plate in pitch and yaw. When used in this capacity, a glass rod with parallel ends may be mounted in the sphere such that the ends of the rod are exposed through apertures in the sphere. The length and refractive index of the rod are selected to produce a desired lateral deviation to the input beam given an angular rotation of the sphere. Refraction of the incoming beam according to Snell's Law deviates/translates the output beam, and translation adjustment in two planes independently can be achieved by rotating the sphere in pitch and yaw as described above.

In certain, highly temperature sensitive applications, it may be beneficial to athermalize the apparatus by forming all components from the same material (e.g., stainless steel or the like). However, when dissimilar materials are used, it is contemplated that thermal expansion and contraction effects can be minimized by using a fixed spring fastener. For example, structural member 24 (lid or top plate) can be formed of a reflexive/resilient material that is capable of retaining or recovering its original shape after being compressed or bent. When the apparatus is fully assembled and adjusted, the fixed spring fastener can assist in providing substantially constant clamping force against sphere 12 notwithstanding temperature fluctuations in the operating environment.

It will be understood that each of the elements described herein, or two or more together, may also find utility in other applications differing from those described above. For example, other conventional optical device mounting methods may be used in conjunction with the present invention as dictated by specific system requirements. Such methods may include, for example, gimbal mounting, as well as the addition of gimballed components to any of the embodiments described herein. While the invention has been illustrated and described as embodied in an apparatus and method for precision adjustment of the angular position of an optical device, it is not intended to be limited to the details shown, since various modifications and substitutions may be made without departing in any way from the spirit of the present invention as defined by the following claims.

What is claimed is:

1. An optical device mounting apparatus comprising a sphere having an outer surface, a support in physical contact with the outer surface of the sphere such that angular displacement of the sphere is possible with substantially no linear displacement thereof, and a clamp in physical contact with the outer surface of the sphere and capable of providing force through the sphere to the support with substantially no transmitted torque to the sphere.

2. The optical device mounting apparatus of claim 1, wherein the sphere is adapted to receive a mounted optical device therein.

3. The optical device mounting apparatus of claim 2, wherein a central axis of the optical device is positioned along a central axis of the sphere.

4. The optical device mounting apparatus of claim 1, wherein at least a portion of the sphere is an optical device.

5. The optical device mounting apparatus of claim 1, wherein the sphere is adapted to receive a removable adjustment tool.

6. The optical device mounting apparatus of claim 1 having at least one clamping force, wherein the sphere has a center of rotation with the at least one clamping force directed through said center of rotation.

7. The optical device mounting apparatus of claim 1, wherein the support comprises a plurality of substantially rigid balls positioned to provide point contact along the outer surface of the sphere.

8. The optical device mounting apparatus of claim 7, wherein the support comprises a three-ball nest.

9. The optical device mounting apparatus of claim 7, wherein the support further comprises a bearing raceway adapted to receive the balls and to allow rotational motion of the balls therein responsive to movement of the sphere.

10. The optical device mounting apparatus of claim 7, further comprising a spring ball retainer.

11. The optical device mounting apparatus of claim 7, wherein the balls are permanently disposed in the support.

12. The optical device mounting apparatus of claim 1, wherein the support comprises a bore adapted to receive the sphere and provide line contact about the outer surface thereof.

13. The optical device mounting apparatus of claim 1, wherein the clamp comprises a fixed spring fastener.

14. The optical device mounting apparatus of claim 1, wherein the sphere includes an optical device.

15. An optical device mounting apparatus comprising a sphere having an outer surface, a support in physical contact with the outer surface of the sphere such that angular displacement of the sphere is possible with substantially no linear displacement thereof, and a clamp in physical contact with the outer surface of the sphere and capable of providing force through the sphere to the support with substantially no transmitted torque to the sphere, wherein the clamp comprises a structural member having an orifice formed therein; a plunger having two ends and slidably disposed within the orifice, the first end being adapted to contact the outer surface of the sphere; a substantially rigid ball disposed within the orifice proximate the second end of the plunger; at least one adjustable fastener positioned on the structural member such as to provide compressive force through the ball; and a spring disposed within the orifice such that the spring supports the ball above the second end of the plunger when compressive force from the at least one adjustable fastener is not sufficient to overcome the opposing compressive force of the spring.

16. The optical device mounting apparatus of claim 15, wherein the at least one adjustable fastener is a single fastener in contact with the substantially rigid ball.

17. A mounting apparatus for an optical device, said mounting apparatus comprising:

a sphere, a center point, and an outer surface;

a support in contact with the outer surface of the sphere; and a clamp in contact with the outer surface of the sphere, the clamp having a first position and a second position;

wherein, the sphere may rotate in any direction about its center point without substantial linear displacement of the center point when the clamp is in the first position and the sphere is prevented from rotating when the clamp is in the second position.

18. The optical device mounting apparatus of claim 17, wherein the sphere includes an optical device.

19. A method of precisely adjusting the angular position of an optical device, said method comprising the steps of:
   a) providing a sphere including the optical device;
   b) supporting the sphere such that angular displacement of the sphere is possible without substantial linear displacement thereof;
   c) altering the angular position of the sphere; and
   d) fixing the sphere in an altered position without substantially displacing the sphere in any direction.

20. The method of claim 18, wherein step (a) comprises mounting the optical device within the sphere.

21. The method of claim 20, further comprising the step of positioning a central axis of the optical device along a central axis of the sphere before altering the angular position of the sphere.

22. The method of claim 19, wherein step (b) further comprises supporting the sphere such that angular displacement of the sphere is possible with minimal stiction.

23. The method of claim 19, wherein step (c) is performed with a removable adjustment tool.

24. The method of claim 19, wherein step (d) comprises directing a clamping force through the center of rotation of the sphere.

25. The method of claim 19, wherein step (b) comprises positioning a plurality of substantially rigid balls such as to provide point contact with the sphere.

26. The method of claim 25, wherein step (b) is performed with a three-ball nest.

27. The method of claim 25, wherein step (b) further comprises providing a bearing raceway adapted to receive the balls and to allow rotational motion of the balls therein responsive to movement of the sphere.

28. The method of claim 25, further comprising the step of maintaining the position of the plurality of substantially rigid balls relative to each other.

29. The method of claim 25, further comprising the step of kinematically locating the balls in a bearing raceway.

30. The method of claim 19, wherein step (b) is performed with a support comprising a bore adapted to receive the sphere and provide line contact therewith.

31. The method of claim 19, further comprising the step of maintaining the sphere in the altered position with a fixed spring fastener.

32. A method of precisely adjusting the angular position of an optical device, said method comprising the steps of:
   a) providing a sphere including the optical device;
   b) supporting the sphere such that angular displacement of the sphere is possible without substantial linear displacement thereof;
   c) altering the angular position of the sphere; and
   d) fixing the sphere in an altered position without substantially displacing the sphere in any direction wherein step (d) is performed with a clamp comprising a structural member having an orifice formed therein; a plunger having two ends and slidably disposed within the orifice, the first end being adapted to contact the outer surface of the sphere; a substantially rigid ball disposed within the orifice proximate the second end of the plunger; at least one adjustable fastener positioned on the structural member such as to provide compressive force through the ball; and a spring disposed within the orifice such that the spring supports the ball above the second end of the plunger when compressive force from the at least one adjustable fastener is not sufficient to overcome the opposing compressive force of the spring.

33. The method of claim 32, wherein the at least one adjustable fastener is a single fastener in contact with the substantially rigid ball.

34. An optical device mounting apparatus comprising a sphere having an outer surface, a support in physical contact with the outer surface of the sphere such that angular displacement of the sphere is possible with substantially no linear displacement thereof, and a clamp in physical contact with sphere and capable of providing force through the sphere to the support with substantially no transmitted torque to the sphere, said sphere including an optical device mounted at the center of the sphere.

35. An optical device mounting apparatus comprising a sphere having an outer surface, a support in physical contact with the sphere at no more than three contact points, such that angular displacement of the sphere is possible with substantially no linear displacement thereof, and a clamp in physical contact with the sphere at a fourth contact point and capable of providing force through the sphere to the support with substantially no transmitted torque to the sphere.

36. An optical device mounting apparatus comprising a sphere having an outer surface, a support in physical contact with the outer surface of the sphere such that angular displacement of the sphere is possible with substantially no linear displacement thereof, and a clamp in physical contact with the outer surface of the sphere and capable of providing a force through the sphere to the support with substantially no transmitted torque to the sphere, said sphere being able to rotate in any direction.

\* \* \* \* \*